US012801714B2

(12) United States Patent
Palmin

(10) Patent No.: US 12,801,714 B2
(45) Date of Patent: Nov. 17, 2026

(54) CERTIFICATE MANAGEMENT METHOD FOR HETEROGENEOUS INSTALLATIONS, COMPUTER SYSTEM AND COMPUTER PROGRAM PRODUCT

(71) Applicant: Siemens Aktiengesellschaft, Munich (DE)

(72) Inventor: Anna Palmin, Karlsruhe (DE)

(73) Assignee: Siemens Aktiengesellschaft, Munich (DE)

( * ) Notice: Subject to any disclaimer, the term of this patent is extended or adjusted under 35 U.S.C. 154(b) by 294 days.

(21) Appl. No.: 18/708,058

(22) PCT Filed: Oct. 27, 2022

(86) PCT No.: PCT/EP2022/080131
§ 371 (c)(1),
(2) Date: May 7, 2024

(87) PCT Pub. No.: WO2023/083625
PCT Pub. Date: May 19, 2023

(65) Prior Publication Data

US 2026/0161765 A1 Jun. 11, 2026

(30) Foreign Application Priority Data

Nov. 11, 2021 (EP) .................................... 21207789

(51) Int. Cl.
*G06F 21/33* (2013.01)
*H04L 9/32* (2006.01)
*H04L 9/40* (2022.01)

(52) U.S. Cl.
CPC ............ *G06F 21/33* (2013.01); *H04L 9/3268* (2013.01); *H04L 63/0823* (2013.01)

(58) Field of Classification Search
CPC .... G06F 21/33; H04L 63/0823; H04L 9/3268
USPC .............................................................. 726/1
See application file for complete search history.

(56) References Cited

U.S. PATENT DOCUMENTS 11,163,870 B2 * 11/2021 Lutz .................... H04L 63/0823
11,552,803 B1 * 1/2023 Simkhada ............... G06F 21/73
2011/0113240 A1 * 5/2011 Fu ......................... H04L 9/3268
713/156

(Continued)

OTHER PUBLICATIONS

PCT International Preliminary Report on Patentability mailed Feb. 13, 2024, corresponding to PCT International Application No. PCT/EP2022/080131, filed Oct. 27, 2022, pp. 1-8.

*Primary Examiner* — Thanh T Le
(74) *Attorney, Agent, or Firm* — Lempia Summerfield Katz LLC

(57) ABSTRACT

The configuration of the Registration Authority (RA) needs to be supplemented with a configurable new check rule. The check rules are taken into consideration when validating the certificate requests. When a certificate request is validated, the Registration Authority RA determines, based on the new check rule assigned to this installation component, at which location it may search for this new check rule in the directory/inventory and how it may form it, possibly from multiple parts (for example, the serial number and the MLFB). The described problem is solved by giving the Registration Authority RA the capability of handling various new check rules when validating the certificate requests in a heterogeneous industrial installation.

12 Claims, 4 Drawing Sheets

Option 1

(56) References Cited

U.S. PATENT DOCUMENTS

| | | | |
|---|---|---|---|
| 2012/0131652 | A1 | 5/2012 | Anand et al. |
| 2018/0278607 | A1* | 9/2018 | Loladia ............... H04L 61/4588 |
| 2019/0149342 | A1 | 5/2019 | Fynaardt et al. |
| 2020/0374700 | A1* | 11/2020 | Smith ..................... G06F 21/44 |
| 2022/0368725 | A1* | 11/2022 | Wright .................. H04L 9/3263 |

* cited by examiner

CERTIFICATE MANAGEMENT METHOD FOR HETEROGENEOUS INSTALLATIONS, COMPUTER SYSTEM AND COMPUTER PROGRAM PRODUCT

The present patent document is a § 371 nationalization of PCT Application Serial No. PCT/EP2022/080131, filed Oct. 27, 2022, designating the United States, and this patent document also claims the benefit of European Patent Application No. 21207789.5, filed Nov. 11, 2021, which are incorporated by reference in their entireties.

TECHNICAL FIELD

The present disclosure relates to certificate management methods for heterogeneous installations and computer systems for certificate management for heterogeneous installations.

BACKGROUND

The increasing use of open IT standards and protocols and the requirements of IEC 62443 (“Industrial communication networks—IT security for networks and systems”) as the leading industrial security standard is also leading to an increased need for protection in the industrial environment. The communication connections in control systems of technical installations increasingly have to be secured, i.e., protected appropriately against unauthorized access.

One appropriate form of protection may include the encipherment and/or the authentication of the transmitted data. Corresponding encipherment and authentication mechanisms are generally part of secure communication protocols (such as TLS, OPC UA). The use of secure communication protocols in this case requires the communication participants to have up-to-date digital certificates.

The certificates used in an operative environment (such as in the industrial installation already mentioned above) in order, for example, to enable secure communication or user authentication are referred to below as what are known as operational certificates (OC). For security reasons, it is recommended to use a dedicated operational certificate per communication protocol that is used.

Depending on the role of various components in an industrial installation, (e.g., a process engineering installation or a discrete installation), and depending on the communication protocol used, a multiplicity of certificates per component, having different key usages, may be required for operation, (e.g., OPC Unified Architecture (UA) certificates for communication with an external system using OPC UA; TLS certificates for operation and observation via the Web (HTTPS); or TLS certificates for secure transmission of log information and security events to a central instance (via Secure Syslog according to RFC 5425)).

As the number of installation components involved in secure communication relationships and requiring certificates increases, it makes sense to automate the issuance of operational certificates, (based on the certificate requests (CR) generated by the installation components), and the assignment of the issued certificates to the components. Such automated certificate management may require what is known as a public key infrastructure (PKI) that may be present in the respective operative environment (for example, of an industrial installation). In cryptology, a public key infrastructure (PKI) denotes a system that is able to issue, distribute, and check digital certificates. The certificates issued within a PKI are used to secure computer-aided communication.

Missing certificates may be requested, and certificates that are no longer required may be revoked, by a registration authority (RA) acting as an intelligent gateway. In this case, the registration authority RA checks whether the incoming certificate requests and/or revocation requests are correct and whether they are signed by legitimate, trustworthy installation components, i.e., depending on the existing certificate management scenario (such as “bootstrapping,” “update,” or “revocation”). Regarding bootstrapping, the creation of a basis for a PKI environment, including the certification authorities CA and delegates, has to be performed after a new system installation before the system is able to be used to produce certificates. This checking uses the respective manufacturer device certificates (MDC), customer device certificates (CDC), or their operational certificates (OC)—these being listed in the certificate inventory, what is known as the “inventory” of the installation. If the registration authority RA establishes, when checking a request, that the request is incorrect or that the requesting party is not known directly thereto and has submitted its request via an untrustworthy LRA, then it declines the request. The respective requesting party thus does not receive the requested certificates and/or its revocation request is not forwarded to the responsible certification authority CA.

According to the current concepts, the installation components may be recorded manually in the inventory by a user (who has proven their trustworthiness in a specific way), by virtue of the user filling in an input mask manually or with the aid of a script:

<Input Mask Example>

Name: SIMATIC S7-1500CPU1

Device Identifier: 64eeexxx

Manufacturer: Siemens AG

Man. Device Certificate: MDC_1500.cer

LastPoO:______

Additional Customer______

Device Certificate:______

Customer Device Certificate:______

Local Registration Authority______

Some information in the mask may be optional (see in this regard, for example, the bottom four rows), while other information (in particular device name, manufacturer name and device identifier) is mandatory, because the information is required to uniquely identify the installation components.

As an alternative to manual recording, installation components may be recorded in the inventory of the installation in an automated manner following a successful proof of originality check, for example, as part of provisioning.

In this case, the inventory may be represented by a dedicated component 1053, or a component integrated into the registration authority RA, such as a list or a database.

The inventory/inventory entry corresponding to an installation component, according to the current concepts, may include the following component parts: name (device name and/or name allocated in the installation context); name of the manufacturer; device number, device ID (such as the serial number of the installation component or a product instance URI, uniform resource identifier); time of the proof of originality check (optional); manufacturer device certificate (MDC); customer device certificate (CDC); local registration authority (LRA) via which installation components that are not able to reach the registration authority RA directly on the network transmit their certificate requests or revocation requests to the RA; last-issued customer device certificates (CDC); or last-issued operational certificates (OC).

One example of an inventory in this regard is illustrated below in Table 1:

TABLE 1

| No | Device name | Manufacturer | Serial number | MRPD | URI | MDC | CDC | OC |
|---|---|---|---|---|---|---|---|---|
| 1 | Simatic S7-1500 | Siemens AG | 875gcb8965 | 6ES7144-1FB31--0XB0-Z | 234t56z88 | 12345 . . . | | |
| 2 | Simatic S7-4100 | Siemens AG | 975-g987621 | 97432144-1FB31-0XB0-Z | — | 98765 . . . | | |
| 3 | Cisco Device | Cisco | 87634gtz986 | | — | . . . (confirmed) | | |
| 4 | IoT Device | XYZ | tzq9845 | | — | oooooo | | |
| 5 | Switch | ABC | tzq9845 | | — | iiiiii | | |

See in this regard also the exemplary illustration of the validation process in FIG. 3.

The inventory applied/constructed in the described way is used in the installation context, inter alia, by the registration authority RA when validating the incoming certificate requests and revocation requests. In particular, when the customer certificates (customer device certificates, CDC) are initially requested 301, the customer certificates being intended to bind the installation components to the installation and to form the basis for the requesting of further application-specific certificates (operational certificates, OC), the registration authority RA checks whether the incoming certificate request comes from a component that is already contained in the inventory and that has thus already been subjected to an appropriate check and is allowed to request certificates in the context of the installation, 302.

The registration authority RA additionally validates the signature of the certificate request using the signing certificate used for signing, with the associated manufacturer device certificate, MDC, e.g., playing the role of the signing certificate in the CDC request. During the check 303, in consultation with the inventory, the registration authority RA in particular takes into consideration what is known as the device ID, which is contained both in the corresponding inventory/inventory entry and in the certificate entry and in the certificate (for example, manufacturer device certificate (MDC)) used to sign the entry (and likewise contained in the inventory/inventory entry).

If the certificate entry does not match the signing certificate (for example, MDC), 304, then the validation has failed, 311. Otherwise, 305, the inventory entry having the serial number contained in the certificate request/signing certificate is sought, 306. The validation is successful, 310, if the corresponding entry was found, 308, in an additional check, 307. Otherwise, 309, the validation has likewise failed.

The problem on which the present disclosure is based is down to the fact that there are currently multiple or different manufacturer-specific and protocol-specific requirements or stipulations with regard to the device ID.

By way of example, in accordance with the IEEE 802.1AR ("Secure Device Identity") standard, this role may be taken on by the serial number of the devices. However, it has been established in this connection that it may be the case that the serial number of the devices is not one-to-one across all plants for some manufacturers (for example Siemens). In order to avoid collisions, the requirement has been created for some devices to link or to concatenate the serial number of the respective device with the MRPD (machine-readable product designation) of the device, so as thereby to give a unique device number/device ID. At the same time, the OPC UA Specification, Part 21, which however applies only to UA devices, requires the "product instance URI" to be considered to be a unique device number/device ID. Thus, an MDC the contents of which are designed in accordance with the OPC UA Specification Part 21 contains the serial number (as part of the "subject"), on the one hand, and the "product instance URI", on the other hand, as value of the parameter subject alternate name (SAN). See in this regard the following Table 2:

TABLE 2

| Field | Type according to OPC UA Part 21 |
|---|---|
| Version | 3 |
| Serial number | [Positive whole number of up to 20 bytes] unique in the validity range of the issuing CA |
| Signature algorithm | RSA-2048/SHA-256, ECDSA P-256/SHA-256 or ECDSA P-384/SHA-384 |
| Issuing authority | Subject Distinguished Name of Issuing CA |
| Validity | Until an indefinite future time (e.g., the value GeneralizedTime, 99991231235959Z) |
| Subject | Distinguished Name serialNumber = [product serial number] unique in the domain of the issuing instance |
| Subject Public Key Info | [Public key algorithm], [Public Key] |
| Authority Key Identifier | [Identifier of the keys of the issuing CA] |
| Subject Key Identifier | Not recommended/should not be used |
| Key Usage (critical) | digitalSignature keyEncipherment (optional) marked as critical |
| Subject Alt Name | Uri - ProductInstanceUri |
| Basic Constraints | "The expansion may appear as a critical or non-critical expansion in the end participant certificates", RFC 5280 |

The problem on which the present disclosure is based is therefore that it is not possible to define a uniform process for the validation of certificate requests in a heterogeneous installation due to the various requirements and stipulations (which may possibly also change dynamically) with regard to the device number device ID. By way of example, the process illustrated in FIG. 3 applies only to devices/manufacturers that use the serial number of the devices as a device ID, these being read out from what is known as the "subject". For OPC UA devices, the process in principle would have to be adapted by using the product instance URI contained under "SAN" as device ID instead of the serial number contained in "subject." However, if the product instance is not yet evaluated in the context of a specific installation, the serial number, the serial number linked to the MRPD or a device ID formed in some other way is also used for the OPC UA devices. The corresponding requirements and stipulations may also sometimes change dynamically, which may be influenced in a fully automated manner and/or by the user (for example, by appropriate manual inputs performed thereby).

SUMMARY

The object of the disclosure is therefore to specify a system and method that solve the problems described above. The scope of the present disclosure is defined solely by the appended claims and is not affected to any degree by the statements within this summary. The present embodiments may obviate one or more of the drawbacks or limitations in the related art.

The object is achieved by a method, by a system, and by a computer program product as described herein.

The method offers certificate management for heterogeneous installations, wherein the installation includes at least two components and a certificate manager stores information about the components in an inventory.

The certificate manager receives, from each component, a request for a certificate for operation and/or communication, and, after checking the request, decides whether this certificate is able to be granted or confirmed. The check, depending on respective component-specific rules, is based on information about the component present in the inventory. The inventory stores additional information about a device profile, which additional information indicates, for the component to be checked, a respective valid check rule based on which the check takes place, or a suitable certificate is generated.

BRIEF DESCRIPTION OF THE DRAWINGS

The disclosure is illustrated further by the accompanying figures, in which.

DETAILED DESCRIPTION

Figure 1:
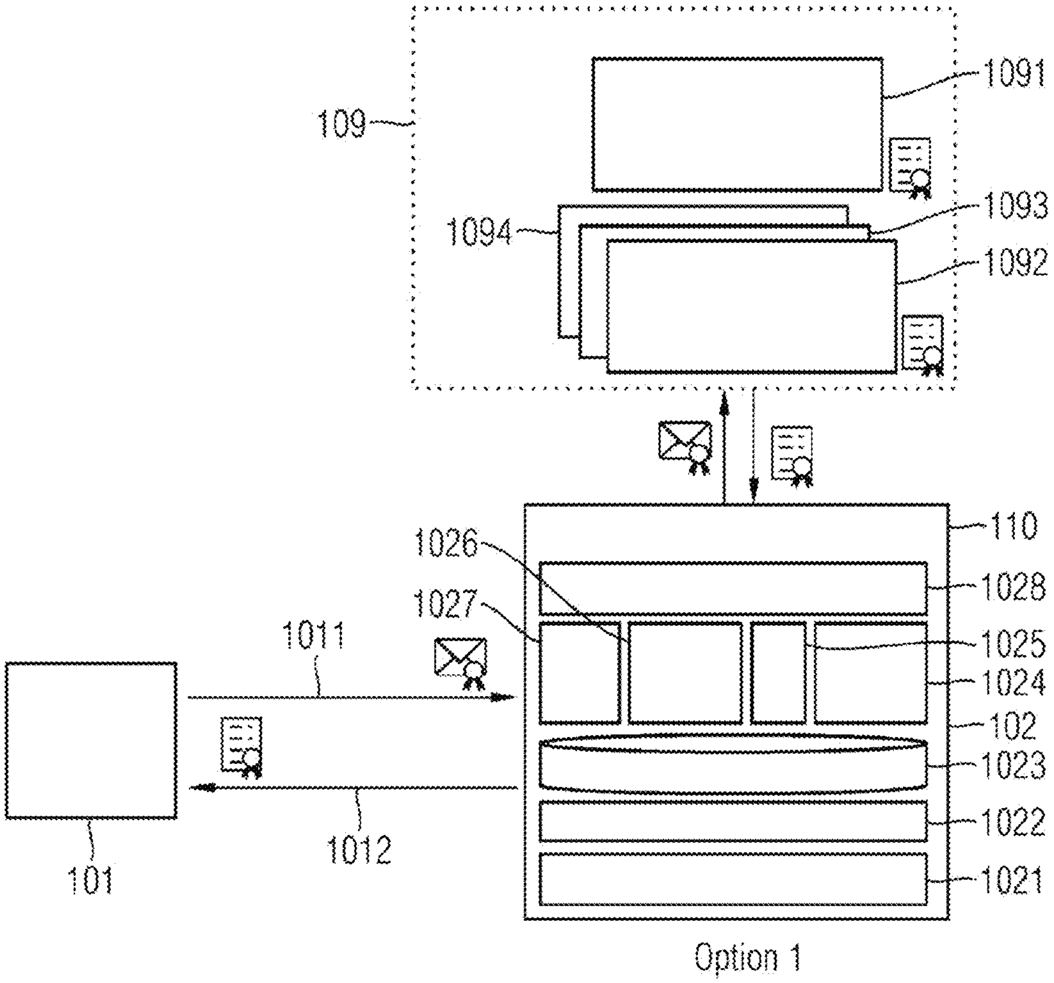
FIG. 1 depicts an example of a certificate management system having an internal inventory.

FIG. 1 shows a certificate management system that includes a certificate authority CA hierarchy, 109, which contains a root CA 1091 and issuing CAs 1092, 1093, 1094. This is linked to the certificate manager, registration authority RA, 102, which contains new check rules, 1026, and for example various other modules such as CMP client/PKI library, 1028, Web UI, 1027, logfiles, 1025, TLS server/client, 1024, the inventory, 1023, a Windows certificate/key store, 1022 and a CMP server/key store, 1021. The device 101 makes a certificate request 1011 to this registration authority RA and expects an appropriate certificate 1012 in response.

An idea of the present disclosure is to supplement the configuration of the registration authority RA or of the instance that takes on the tasks thereof in an industrial installation with (dynamically) configurable new check rules, device ID profiles, and, when recording an installation component in the inventory.

For example, in one task, the component is assigned either a previously configured new check rule, device ID profile, in a fully automated manner (for example based on a rule preconfigured for the type of component) or manually by the responsible user (based on a decision/requirement, handled according to the user), In another task, for example, the responsible user is allowed to define the rules for forming the new check rules device ID during operation, based on which new check rules an additional new check rule, device ID profile, is able to be configured dynamically (possibly at a later time, taking into consideration a larger number of user inputs and based on machine learning).

An idea of the present disclosure is also to take into consideration the device ID profiles that are preconfigured (as described above) or configured dynamically at runtime (on the basis of the user inputs) when validating the certificate requests.

When validating a certificate request that the registration authority RA has received from an installation component, the registration authority RA determines, based on the new check rule device ID profile assigned to this installation component, the location at which (or the column of the table illustrated above by way of example in which) it has to look for this new check rule device ID in the inventory, and how it may potentially compile this from multiple component parts (for example, the serial number and MRPD). The described problem is solved by giving the registration authority RA the ability, when validating the certificate entries in a heterogeneous industrial installation, to process various new check rules device IDs.

Figure 2:
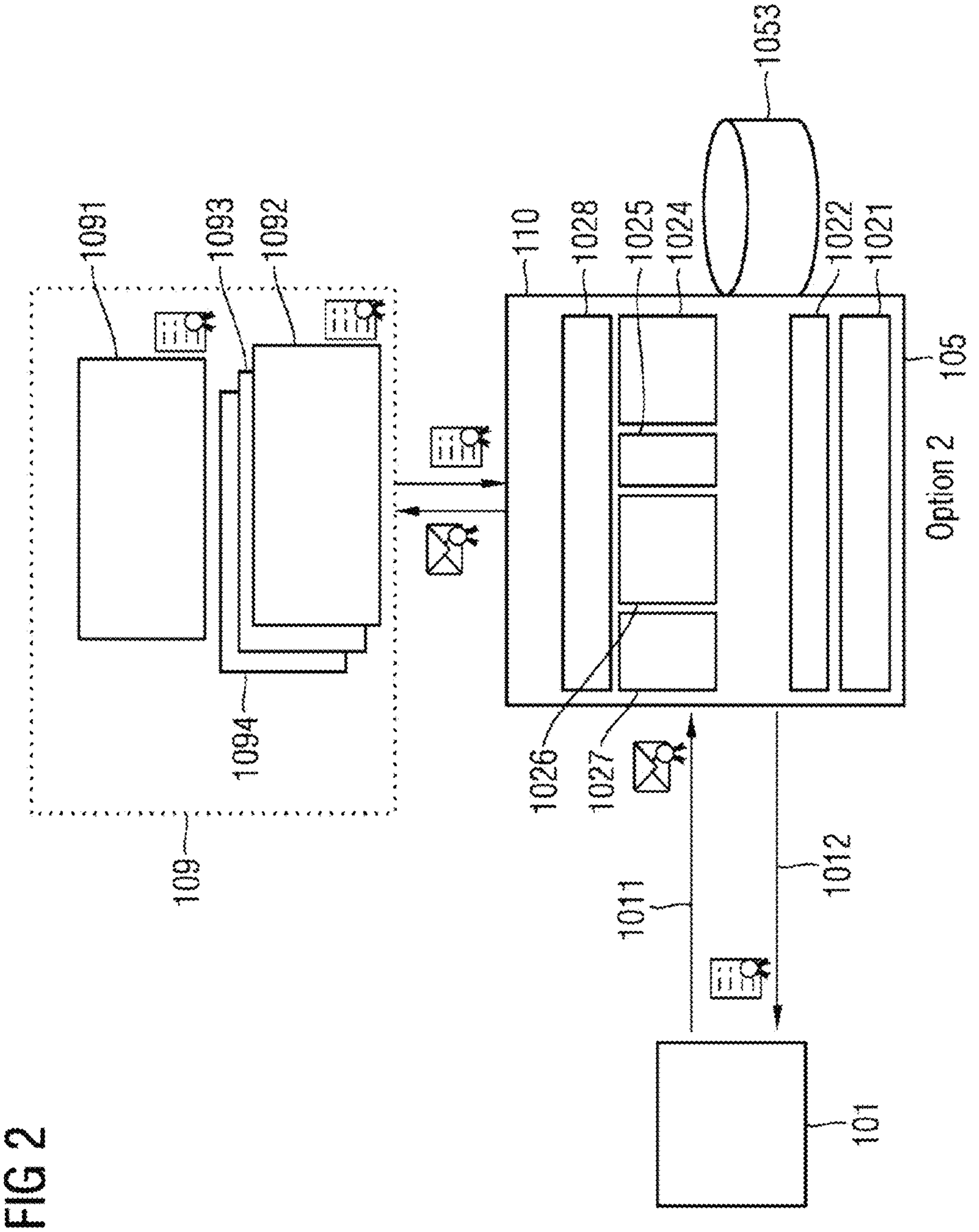
FIG. 2 depicts an example of certificate management using an external inventory.

The technical features required to implement the idea are explained in detail below and are illustrated in two tables and FIGS. 2 and 4.

The configuration of the registration authority RA is expanded by the new check rule device ID profile. This may be configured using a template or directly in a JSON file or XML file. For each new check rule device ID profile, the following rules are in particular defined therefor: how such an ID is compiled/formed; and how the respective profile may be assigned to the specific devices.

See in this regard the exemplary illustration in the following Table 3 regarding a configuration of the device ID profiles (example):

TABLE 3

| Device ID Profile name | Device ID rule | Assignment rule(s) |
|---|---|---|
| Siemens SIMATIC CPU Device ID | Device ID = (Serial Number II MRPD) | (Device Name = SIMATIC S7-*) && (Manufacturer = Siemens AG) |
| OPC UA Part 21 Device ID | Device ID = Product Instance URI | MDC contains (SAN = Product Instance URI |
| IEEE 802.1.AR Device ID | Device ID = Serial Number | Explicit assignment using/for example based on machine learning |

The assignment rules and device ID rules may be changed dynamically at any time. It is also possible at any time to assign an installation component another device ID profile dynamically—either in an automated manner (for example, as part of provisioning) or manually (for example, performed by the user).

By way of example, although an installation component at present supports OPC UA, it does not (yet) support the OPC UA Spec. Part 21 and the product instance URI defined in this part. Therefore, this installation component is at present able to use for example the device ID profile "Siemens SIMATIC CPU Device ID" or "IEEE 802.1.AR Device ID". However, as soon as support for Part 21 is implemented, the installation component may be assigned the device ID profile "OPC UA Part 21 Device ID".

In a second advantageous embodiment, the inventory of the installation is expanded with an additional column "device ID profile," which indicates the new check rules. This is provided in order to make the assignment of the device ID profiles to the installations more flexible and to transparently illustrate which installation component is assigned which device ID profile. Depending on the component or depending on the corresponding assignment rules, the contents of the columns may be able to be changed by the authorized user or not able to be changed ("read-only"). See in this regard the exemplary illustration in the following Table 4, which illustrates, by way of example, an inventory expanded with the indication and assignment of the device ID profiles, based on Table 3.

with regard to programming to offer this selection to the user in the form of a drop-down list.

In a further advantageous embodiment, the registration authority RA takes into consideration the device ID profiles explained above when validating the certificate requests, wherein it first checks, based on the assignment rules introduced above, whether a corresponding profile has already been configured. If such a profile already exists, the registration authority RA uses this profile immediately to determine/compile the device ID. Otherwise, the user is asked to respond to the question as to which device ID profile may be used or how the device ID may be determined or compiled. This procedure is also shown in detail in the flowchart of FIG. 4. To this end, the user may receive suggestions from the registration authority RA. In one advantageous embodiment, it is possible to use machine learning/AI methods to draw conclusions about the existing check rules/device ID profiles or those to be reapplied based on individual decisions/inputs made by the responsible users.

Figure 3:
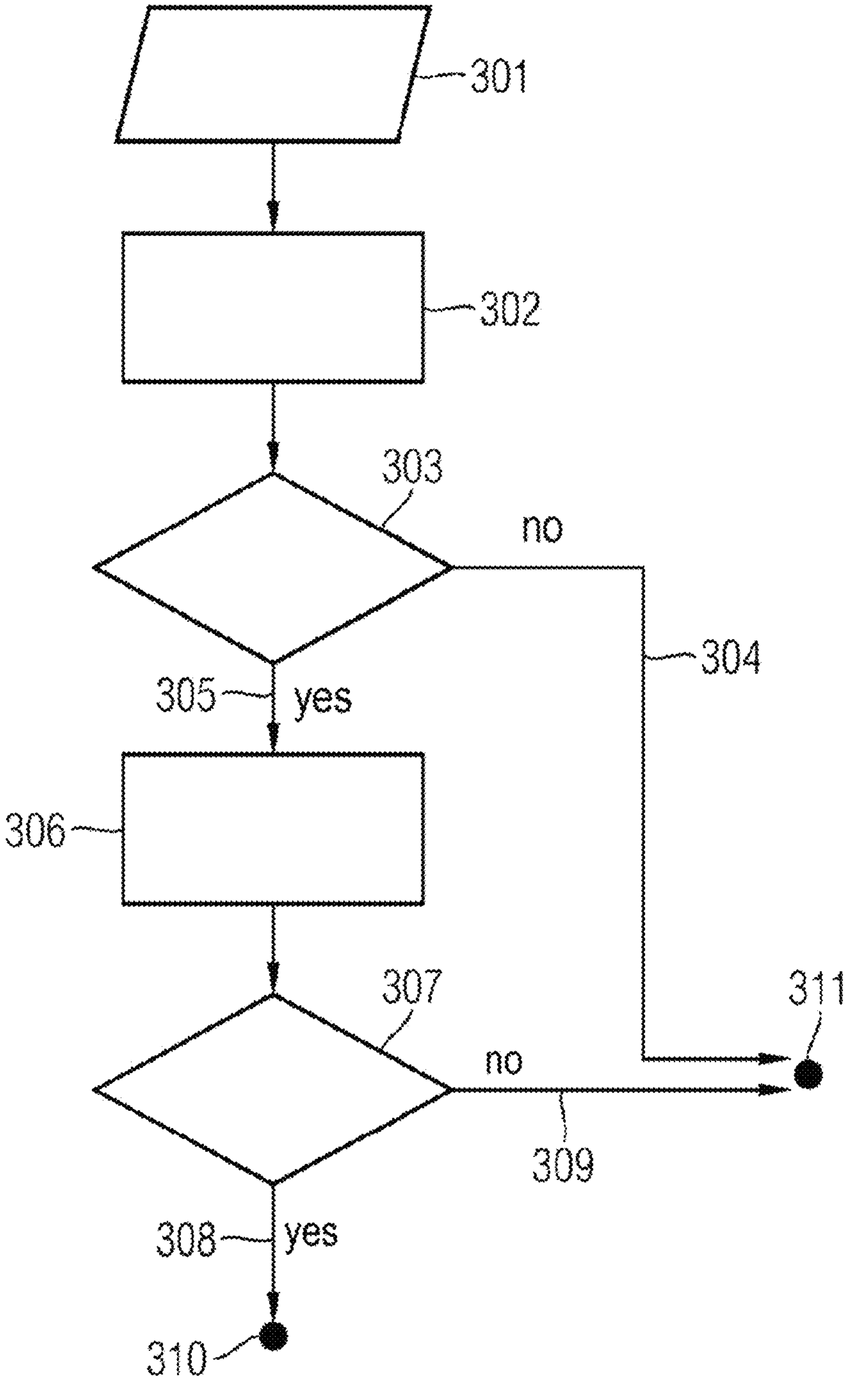
FIG. 3 depicts, by way of example, the validation of a certificate request by the RA based on the serial number as device ID.
Figure 4:
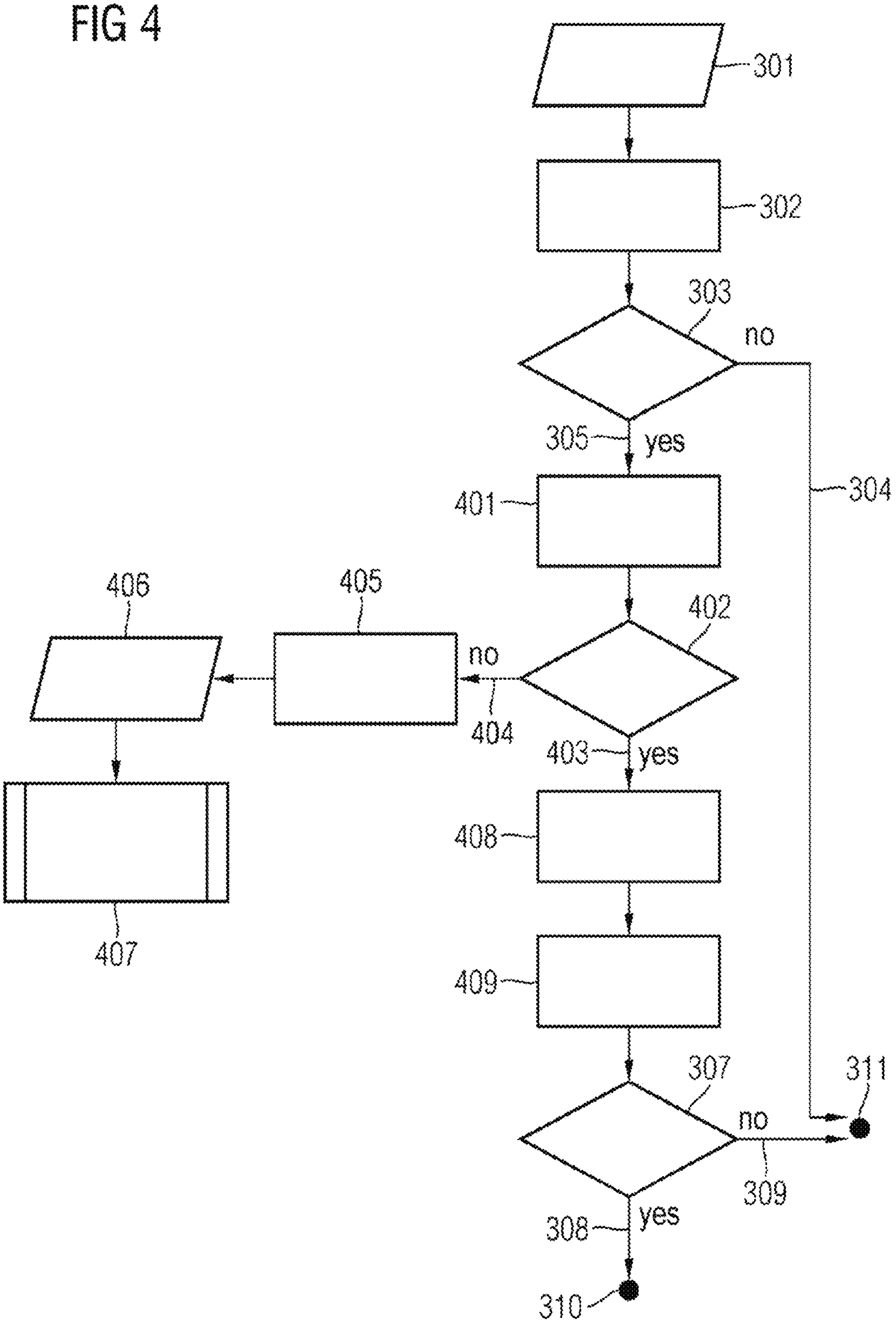
FIG. 4 depicts an example of a validation of a certificate request by the RA based on the determined device ID/device ID compiled in accordance with a corresponding device ID profile.

See in this regard also the exemplary illustration of the validation process in FIG. 4, in particular in comparison with the process discussed above in FIG. 3.

The inventory applied/constructed in the described way is used in the installation context, inter alia, by the registration authority RA when validating the incoming certificate requests and revocation requests. In particular, when the customer certificates are initially requested, signed with a signing certificate, for example MDC 301 (customer device

TABLE 4

| No | Device name | Manufacturer | Serial number | MRPD | Product Instance URI | MDC | CDC | OC | Device ID Profile |
|---|---|---|---|---|---|---|---|---|---|
| 1 | Simatic S7-1500 | S AG | 875gcb8965 | 6ES7144-1FB31 --0XB0-Z | 234t 56z 88 | 12 . . . | | | Siem. SIEMATIC CPU Device ID |
| 2 | Simatic S7-4100 | S AG | 975-g987621 | 97432144-1FB31-0XB0-Z | — | 98 . . . | | | Siem. SIEMATIC CPU Device ID |
| 3 | Cisco Device | Cisco | 87634gtz986 | | — | . . . ( ) | | | IEEE 802.1 AR Device ID |
| 4 | IoT Device | XYZ | tzq9845 | | — | oo . . . | | | OPC UA Part 21 Device ID |
| 5 | Switch | ABC | tzq9845 | | — | ii . . . | | | |

In the event that an authorized user is allowed to assign the preconfigured profiles or profiles configured/applied at runtime to specific installation components, it makes sense certificates, CDC), the customer certificates being intended to bind the installation components to the installation and to form the basis for the requesting of further application-specific certificates (operational certificates, OC), the registration authority RA checks whether the incoming certificate request comes from a component that is already contained in the inventory and that has thus already been subjected to an appropriate check and is allowed to request certificates in the context of the installation, 302.

The registration authority RA additionally validates the signature of the certificate request using the signing certificate used for signing, with the associated manufacturer device certificate, MDC, e.g., playing the role of the signing certificate in the CDC request. During the check 303, in consultation with the inventory, the registration authority RA in particular takes into consideration what is known as the device ID, which is contained both in the corresponding inventory/inventory entry and in the certificate entry and in the certificate (for example, manufacturer device certificate (MDC)) used to sign the entry (and likewise contained in the inventory/inventory entry).

If the certificate request does not match the signing certificate (for example MDC), 304, then the validation has failed, 311. In this regard, the process still matches the procedure described in FIG. 3.

Otherwise, 305, a check is carried out, based on the existing assignments (for example based on device name and manufacturer), as to whether a device ID profile is already configured for this combination, 401. If a matching device ID profile is found (device ID, profile X), 402, 403, the device ID in the certificate request/signing certificate is determined in accordance with the ascertained device ID, profile X, 408.

One example would be device ID=serial number||MRPD or device ID=product instance URI.

The inventory entry containing the ascertained device ID is then sought, 409. The validation is successful when the corresponding entry has been found, 307, 308. Otherwise, 309, the validation has failed.

If no profile is able to be ascertained, 404, when checking for a matching profile, 402, then a matching profile may be ascertained or a new profile may be created, 405, by way of a user input, 406. This user input is then assigned to an existing or newly applied device ID profile, possibly also only after a certain number of inputs or with the aid of machine learning, AI, 407. As soon as the new profile has been applied in this way, then it may be stored back in the inventory.

The described method makes it possible for the registration authority RA in a heterogeneous installation (in spite of the various (possibly dynamically changing) requirements/stipulations with regard to device ID in the case of installation components that may come from different manufacturers) to be able to validate all incoming certificate requests. The certificate profiles introduced for this purpose may in this case be static/preconfigurable and/or configurable dynamically at runtime (based on the user inputs/decisions and ML/AI methods).

This advantageously delivers a profound contribution to the problem-free maintenance of normal operation and to improving protection of process engineering installations over their life cycle. This is because the registration authority RA is constantly able to be expanded dynamically with new assignment rules and check rules/device ID profiles, such that it is capable of validating certificate requests without the registration authority RA software constantly having to be expanded, in burdensome fashion, with new case discriminations ("if . . . then") in order to avoid exceptions.

Automated certificate management is optimized and made more flexible.

The proposed method delivers a significant contribution to satisfying the PKI-related requirements of IEC 62443 and thus also to achieving better interoperability and usability, since all installation components of a heterogeneous (possibly brownfield) installation are now able to be incorporated into certificate management. Only the appropriate device ID profiles need to be present or configured dynamically.

It is to be understood that the elements and features recited in the appended claims may be combined in different ways to produce new claims that likewise fall within the scope of the present disclosure. Thus, whereas the dependent claims appended below depend on only a single independent or dependent claim, it is to be understood that these dependent claims may, alternatively, be made to depend in the alternative from any preceding or following claim, whether independent or dependent, and that such new combinations are to be understood as forming a part of the present specification.

While the present disclosure has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A method for heterogeneous installations comprising at least two installation components and a certificate manager that stores information about the at least two installation components in an inventory, the method comprising:

receiving, by the certificate manager from each installation component of the at least two installation components, a request for a certificate for operation and communication;

checking the request by the certificate manager, wherein the checking, depending on respective component-specific rules, is based on information about a respective installation component present in the inventory, wherein the respective component-specific rules are dependent on protocol-specific requirements, wherein the inventory stores additional information about a device profile, and wherein the additional information indicates, for the respective installation component being checked, a valid check rule based on which the checking takes place;

deciding, by the certificate manager, whether the certificate is able to be validated; and generating and outputting the certificate upon successful validation by the certificate manager based on the valid check rule.

2. The method of claim 1, wherein a first installation component of the at least two installation components, forming a heterogeneous installation, uses first component-specific rules to form and check certificates, and wherein a second installation component of the at least two installation components uses second component-specific rules, different from the first component-specific rules, to form and check certificates.

3. The method of claim 2, wherein the check rule is formed based on the information from which a check rule is compiled or formed, and how the respective check rule is configured to be assigned to a respective installation component of the at least two installation components.

4. The method of claim 2, wherein in a directory, the additional information in the device profile comprises an assigned preconfigured check rule.

5. The method of claim 1, wherein the protocol-specific requirements derive from protocol IEEE 802.1AR or from OPC UA specification.

6. The method of claim 1, wherein the information about the at least two installation components comprises a device name of a respective installation component, a manufacturer of the respective installation component, a serial number of the respective installation component, a machine-readable product designation, a product instance uniform resource identifier, or a combination thereof.

7. The method of claim 1, wherein the check rule is formed based on the information from which a check rule is compiled or formed, and how the respective check rule is configured to be assigned to a respective installation component of the at least two components.

8. The method of claim 1, wherein in a directory, the additional information in the device profile comprises an assigned preconfigured check rule.

9. The method of claim 2, wherein the information about the at least two installation components comprises a device name of a respective installation component, a manufacturer of the respective installation component, a serial number of the respective installation component, a machine-readable product designation, a product instance uniform resource identifier, or a combination thereof.

10. A computer system for certificate management for heterogeneous installations, the computer system comprising:

an inventory configured to store information about at least two installation components of an installation, wherein the computer system is configured to:

receive, from each installation component of the at least two installation components, a request for a certificate for operation and/or communication;

perform a check of the request, wherein the check, depending on respective component-specific rules, is based on information about a respective installation component present in the inventory, wherein the respective component-specific rules are dependent on protocol-specific requirements, wherein the inventory is configured to store additional information about a device profile, and wherein the additional information indicates, for the respective installation component being checked, a valid check rule based on which the checking takes place;

decide whether the certificate is able to be validated; and generate and output the certificate upon successful validation based on the valid check rule.

11. The computer system of claim 10, wherein the inventory is a standalone structural unit.

12. A non-transitory computer readable medium comprising a computer program product for certificate management for heterogeneous installations, wherein, the computer program product, when executed within a computer system, is configured to cause a certificate manager of the computer system to:

receive, from each installation component stored within an inventory of the computer system, a request for a certificate for operation and/or communication;

perform a check of the request, wherein the check, depending on respective component-specific rules, is based on information about a respective installation component present in the inventory, wherein the respective component-specific rules are dependent on protocol-specific requirements, wherein the inventory is configured to store additional information about a device profile, and wherein the additional information indicates, for the respective installation component being checked, a valid check rule based on which the checking takes place;

decide whether the certificate is able to be validated; and generate and output the certificate upon successful validation based on the valid check rule.

* * * * *